(12) United States Patent
Chintala (10) Patent No.: US 9,472,982 B2
(45) Date of Patent: Oct. 18, 2016

(54) WIRELESS POWER

(76) Inventor: Sandeep Kumar Chintala, London (GB)

(*) Notice: Subject to any disclaimer, the term of this patent is extended or adjusted under 35 U.S.C. 154(b) by 85 days.

(21) Appl. No.: 13/816,815

(22) PCT Filed: Aug. 13, 2011

(86) PCT No.: PCT/EP2011/064002
§ 371 (c)(1),
(2), (4) Date: Feb. 13, 2013

(87) PCT Pub. No.: WO2012/069218
PCT Pub. Date: May 31, 2012

(65) Prior Publication Data
US 2013/0142230 A1    Jun. 6, 2013

(30) Foreign Application Priority Data
Aug. 13, 2010  (GB) .................... 1013590.3

(51) Int. Cl.
| | | |
|---|---|---|
| *H04B 5/00* | (2006.01) | |
| *H04B 1/04* | (2006.01) | |
| *H04B 1/38* | (2015.01) | |
| *H02J 17/00* | (2006.01) | |
| *H02J 5/00* | (2016.01) | |

(52) U.S. Cl.
CPC ............ *H02J 17/00* (2013.01); *H02J 5/005* (2013.01)

(58) Field of Classification Search
CPC ...... H02J 5/005; H02J 17/00; H04B 5/0031; H04B 5/0037
USPC ............... 455/41.1, 127.1, 269–280, 343.1, 455/572–573
See application file for complete search history.

(56) References Cited

U.S. PATENT DOCUMENTS

| | | | |
|---|---|---|---|
| 6,427,065 B1* | 7/2002 | Suga et al. ................... | 455/41.1 |
| 6,615,074 B2* | 9/2003 | Mickle et al. ................ | 600/509 |
| 7,180,421 B2* | 2/2007 | Pahlaven et al. ........... | 340/572.1 |
| 7,994,923 B2* | 8/2011 | Watanabe et al. .......... | 340/572.7 |
| 8,260,199 B2* | 9/2012 | Kowalski ..................... | 455/41.1 |
| 8,634,928 B1* | 1/2014 | O'Driscoll et al. ............ | 607/61 |

(Continued)

FOREIGN PATENT DOCUMENTS

| | | |
|---|---|---|
| EP | 2151907 A2 | 2/2010 |
| JP | H0292041 A | 3/1990 |

(Continued)

OTHER PUBLICATIONS

International Search Report for PCT/EP2011/064002.

*Primary Examiner* — Simon Nguyen (57) ABSTRACT

An apparatus can receive and transfer data and energy between adjacent apparatus in a chain. Each apparatus comprises an input antenna for receiving an input signal which is tuned and impedance matched for a receiver and demodulator in a control circuit. The demodulated signal is provided as input to a transmitter module to create an output signal. The input signal is then impedance transformed to generate a sufficient voltage to energize a power supply which charges a battery. The input signal and the output signal can be a radio signal, a magnetic induction signal, or a combined radio and magnetic induction signal. A controller in the control circuit monitors the condition of the battery and power supply and controls a switch operable to selectively power parts of the apparatus dependently upon their monitored condition.

18 Claims, 6 Drawing Sheets

(56) References Cited

U.S. PATENT DOCUMENTS

| | | | |
|---|---|---|---|
| 8,855,554 B2* | 10/2014 | Cook et al. | 455/41.1 |
| 2008/0084277 A1* | 4/2008 | Korekoda | 340/10.1 |
| 2008/0214132 A1* | 9/2008 | Kurokawa | 455/272 |
| 2009/0033479 A1* | 2/2009 | Tanemura | 340/447 |
| 2009/0058190 A1* | 3/2009 | Tanaka | 307/104 |
| 2010/0210207 A1* | 8/2010 | Goto et al. | 455/41.1 |
| 2010/0219694 A1* | 9/2010 | Kurs et al. | 307/104 |
| 2011/0127843 A1* | 6/2011 | Karaoguz et al. | 307/104 |
| 2011/0127954 A1* | 6/2011 | Walley | H01M 2/0267 320/108 |
| 2011/0147868 A1* | 6/2011 | Kurokawa | 257/428 |
| 2011/0266880 A1* | 11/2011 | Kim et al. | 307/104 |
| 2013/0334892 A1* | 12/2013 | Hall et al. | 307/104 |
| 2014/0203758 A1* | 7/2014 | Moshfeghi | 320/103 |

FOREIGN PATENT DOCUMENTS

| | | |
|---|---|---|
| JP | 2002236890 A | 8/2002 |
| JP | 2006067608 | 3/2006 |
| JP | 2007183788 A | 7/2007 |
| JP | 2009500999 A | 1/2009 |
| JP | 2009049455 A | 3/2009 |
| JP | 2009088976 | 4/2009 |
| JP | 2009134660 A | 6/2009 |
| JP | 2010068632 A | 3/2010 |
| WO | WO 2005124962 A1 | 12/2005 |
| WO | 2010025156 A1 | 3/2010 |
| WO | WO 2010028092 A1 | 3/2010 |
| WO | WO 2010057224 A1 | 5/2010 |

* cited by examiner

WIRELESS POWER

CROSS REFERENCE TO RELATED APPLICATIONS

This patent application is a national phase entry under 35 U.S.C. §371 of PCT International Patent Application PCT/EP2011/064002, filed Aug. 13, 2011, designating the United States and published in English as international Patent Publication WO2012/069218 A1 on May 31, 2012, which claims the benefit, under Article 8 of the PCT, of U.K. Patent Application No. GB 1013590.3, filed Aug. 13, 2010, the entire disclosure of each of which is hereby incorporated herein by this reference.

FIELD OF THE INVENTION

The present invention relates to data wireless transfer between equipment. It further relates to data transfer where the total energy required is minimized.

BACKGROUND OF THE INVENTION

Digital data is now commonly transferred within buildings and dwellings. A non exhaustive list, to which many others could be added, includes instructional and informational digital signals provided between items of computer equipment, control and feedback digital signals provided to and from appliances, and control and content defining digital signals provided to, from and between media equipment such as television displays and recorders, video players, and audio playing and recording equipment.

It is known to employ many different types of medium for transfer of digital data. Wire connection is popular. Twisted pair wires can be used, as in Ethernet cables, or co-axial cable, multi screened cable or any other sort of wire or cable. Wires and cables are not without their disadvantages. Wires and cables have the disadvantage of being lossy, particularly at higher frequencies, are not immune from crosstalk, and, due to inherent inter-conductor capacitance, can impose a maximum and relatively low bandwidth or data rate on any signal. Another problem with wire or cable data transfer links is the existence of inherent characteristic impedance which has to be accurately matched by terminations if reflections in the wire of cable are to be avoided. Reflections can destroy the intelligibility of digital signals and limit the useful distance a digital signal can be propagated. Yet another disadvantage of wires and cables is the immovability of the equipment to which they are attached. The route of equipment wires or cables must be planned and laid out free from obstruction to humans or animals before any move can be made. The aesthetics of cables and wires can also leave much to be desired. When using wire or cable, many considerations, all of which must be simultaneously correct, must be taken into account. The present invention seeks to provide a solution to the many problems encountered when using wires and cables, allowing for easy movement of equipment with none of the myriad matching and bandwidth difficulties.

Some equipment employs fibre optic cables in a domestic or business setting. Fibre optic cables can provide ultra high bandwidths. However, the cables are once again fixed, making movement of the equipment to which they are attached limited, difficult or impossible. Joining fibre optic cables to a terminal or to each other is a precision operation, requiring high skills of any person setting up, connecting or repairing any system. By avoiding some of the problems of wires or cables, fibre optics introduces another set of difficulties. The present invention seeks to avoid problems associated with fibre optic cables, providing instead a solution allowing ready connection with no high skill levels being required.

Wireless data transfer has also been used. As only two examples, Bluetooth (a registered Trademark) is a system of radio transmitters and receivers used, typically, to provide services from remotely connected equipment in a mobile telephone. WiFi is a radio bidirectional coupling protocol using 2.4 GHz or 5 GHz used to couple portable computer equipment to local transceivers providing access to the Internet of any other network. A difficulty with any radio coupling, which is also not unknown with wire, cable or fibre optic coupling, is the relative power requirements of terminal equipment, necessitating at least a fresh battery and possibly a mains power supply for sustainability. This is wasteful of energy, wastes potentially toxic battery and power supply materials and their attendant manufacturing carbon dioxide emissions, is not "green" (a casual term for "environmentally conservational"). The present invention seeks to provide energy efficiency in data transfer. The present invention further seeks to provide for energy transfer in accompaniment with data transfer.

Wireless transfer of energy is known using contact pads whereon an apparatus, such as a rechargeable toothbrush, razor, music player or similar apparatus is placed to allow recharging of an internal battery using a magnetic core within the pad. The core within the pad carries an AC field which can be magnetically coupled to a secondary core within or connected to the apparatus. When the apparatus is placed on the pad, the AC magnetic field induces voltage on a secondary winding on the secondary core. The secondary winding provides charging power fort the battery. It is also known to connect an antenna to the outside glass of a vehicle and feed radio frequency power and energy by means of a capacitive coupling immediately behind the connection point inside the vehicle glass. Both these energy and possible data coupling solutions are extremely short range, and involve intense fields which can be a potential hazard.

BRIEF SUMMARY OF THE INVENTION

The present invention consists of an apparatus for receiving data signals, the apparatus comprising: first antenna means, operable to receive an input signal modulated to include the data signal; means operable to receive and decode the radio signal to provide a decoded data signal; and means operable to convert the input signal into electrical energy for powering the apparatus.

The invention also provides that the apparatus can comprise: means to generate an output radio signal modulated with the decoded data signal; and second antenna means operable to transmit the output radio signal.

The invention also provides that the means operable to convert the input radio signal into electrical energy can comprise; means for converting the signal from the first antenna means into a DC voltage; battery means; and a charger, operable to charge the battery means from the DC Voltage.

The invention also provides that means for converting the signal from the first antenna means into a DC voltage can comprise an antenna impedance matcher operable to match the impedance of the first antenna means to a notional load; can comprise impedance transformation means operable to transform the impedance of the notional load to provide an un-rectified voltage sufficient for rectification; and can comprise rectification and smoothing means operable to provide the DC voltage.

The invention also provides that the battery means is operable to provide power to the apparatus in the absence of the DC voltage, and the DC voltage is employable to contribute power to apparatus when the input radio signal is present.

The invention also provides that the apparatus comprises resting means, operable to set the apparatus into a low power mode when the input radio signal is below a predetermined strength, the rest mode conserving charge in the battery means.

The invention also provides that the apparatus can have, as the input signal, a radio signal, a magnetic induction signal, or combination of a radio signal and a magnetic induction signal.

The invention also provides that the output signal can be a radio signal, a magnetic induction signal, or a combined radio signal and a magnetic induction signal.

For a more complete understanding of the present invention, reference is made to the following detailed description and accompanying drawings. In the drawings, like reference characters refer to like parts throughout the views in which:

BRIEF DESCRIPTION OF THE SEVERAL VIEWS OF THE DRAWING

The invention is further explained, by way of example, by the following description, to be read in conjunction with the appended drawings, in which.

DETAILED DESCRIPTION

Figure 1:
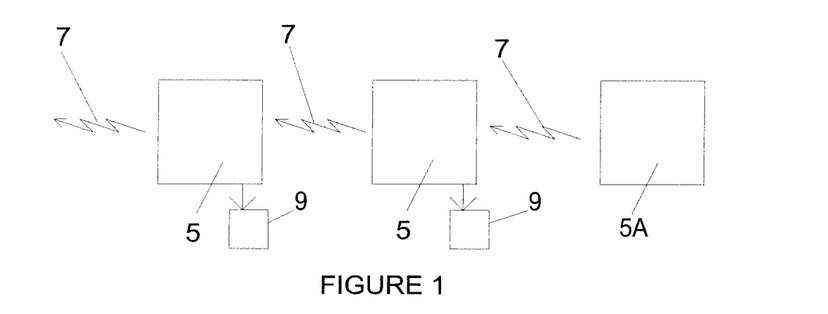
FIG. 1 shows how the invention can be deployed in a chain.

Attention is first to FIG. 1, showing a chain of data and energy transfer apparatus 5 coupled together by data signals 7, being radio or magnetic induction signals, or both, or mixed. Data receiving powered apparatus 9 can be coupled to some or all of the data and energy transfer apparatus 5 in the chain to receive power via the data signals. One data and energy transfer apparatus 5A is at the head of the chain, and does not need to receive an energizing data signal 7, but rather derives its energy from another power source such as a mains derived power supply, and its data signals from a data source (not shown).

So long as the cumulative energy loss between data and energy transfer apparatus 5 down the chain is insufficient to prevent the ability of the penultimate data and energy transfer apparatus 5 in the chain to provide an outgoing data signal to the final data and energy transfer apparatus 5 in the chain to power the data receiving powered apparatus 9, the chain will sustain its complete function.

The chain of FIG. 1 can also be used to deliver useable and informational data to the data receiving powered apparatus 9 coupled to the data and energy transfer apparatus 5.

Not all of the data receiving powered apparatus 9 needs necessarily to receive data, and not all of the data receiving powered apparatus 9 needs to receive power. Some of the data receiving powered apparatus can receive both power and data.

Likewise, not every data and energy transfer apparatus 5 needs to have a data receiving powered apparatus 9 coupled thereto, but can serve merely as a link in the chain.

Figure 2:
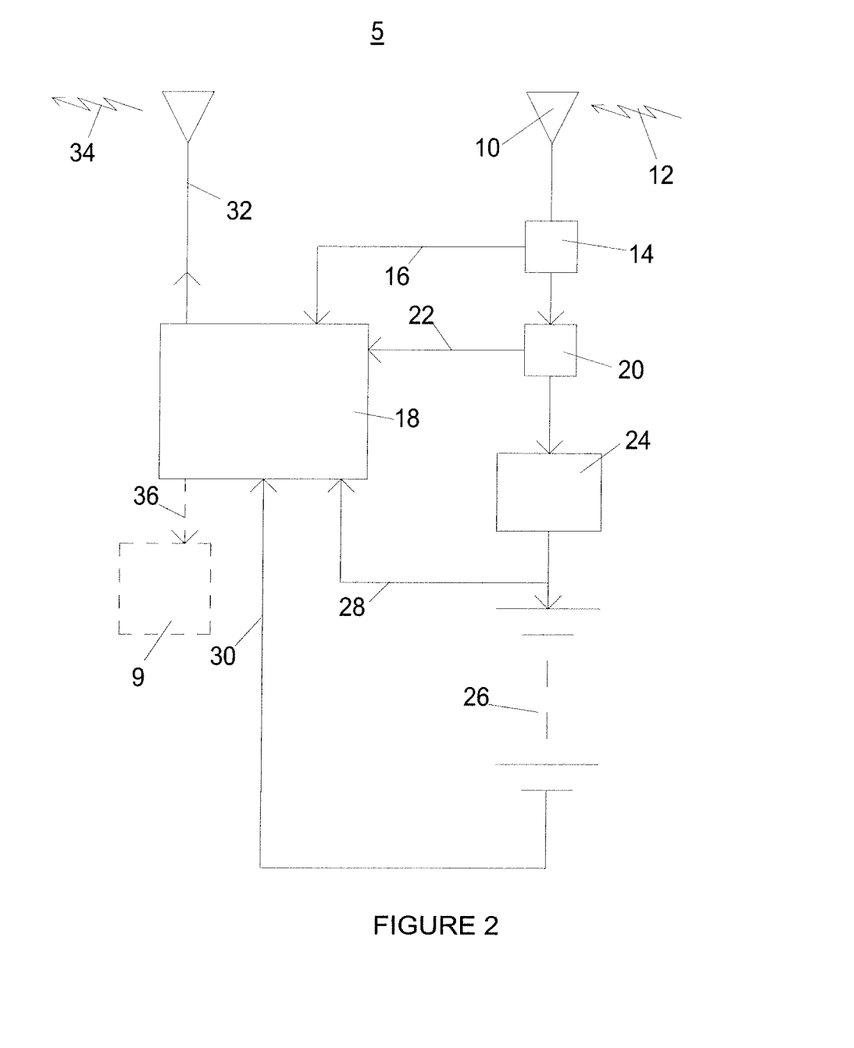
FIG. 2 shows detail of the chain of FIG. 1 and is an example of one possible embodiment of the invention.

Attention is next drawn to FIG. 2, which shows detail of the data and energy transfer apparatus 5 of the chain of FIG. 1 and is an example of one possible embodiment of data and energy transfer apparatus 5

In this example, radio is used. A first antenna 10 an receive an input radio signal 12 which is provided to an antenna tuner 14 to resonate the first antenna 10 and cause it to have an impedance suitable to provide a signal to an input signal line 16 to deliver the data signal to a control circuit 18.

Output from the antenna tuner 14 is also provided to an impedance transformer 20 which increase the voltage delivered by the input radio signal 12 until, hopefully, it is sufficient to provide drive to a DC supply 24. A voltage sufficiency line 22 provides indication to the control circuit 18 when the transformed voltage is large enough to drive the DC power supply 24.

The DC power supply 24 delivers charge to a battery 26 which delivers a positive power input 28 and a negative power input 30 to provide energizing power to the control circuit 18.

The control circuit 18 is operable, when conditions are right, to drive a second antenna 32 to emit an output radio signal 34. The input radio signal 12 and the output radio signal 34 each contain data. The data from the input radio signal 12 is provided to the control circuit 18 via input signal line 16, the data then being recovered by demodulation within the control circuit 18. Data (not necessarily identical to the demodulated data) is modulated onto the output radio signal 34.

The power delivered by the input radio signal 12 is delivered to power the control circuit 18, and also to deliver power to any other device or appliance which is coupled (not shown in FIG. 1) to the control circuit.

The output radio signal is intended for reception by a further apparatus, similar to that show in FIG. 1. A chain of FIG. 1 apparatus can thus be formed. Of course, if a particular FIG. 1 apparatus is the last in a chain, there is no need to emit an output radio signal 34.

As will be made clear later, the first and second antennas can have various forms for radio signals. The apparatus can also operate using inductive magnetic fields operating at high frequencies.

Those skilled in the art will be aware of other schemes of arranging an antenna or magnetic field induction coil snatching to deliver data and sufficient voltage to drive a DC power supply 24. Such other schemes are to be found, as just one example, in the publications of the Radio Society of Great Britain (RSGB) and of the American Radio Relay League (ARRL).

In FIG. 2, a data receiving powered apparatus 9 is shown in broken outline, not being a necessary part of the data and energy transfer apparatus 5 not being necessarily coupled to the control circuit 18. The data receiving powered apparatus 9 is shown coupled to the control circuit 16 via a power and/or data coupling 36.

Figure 3:
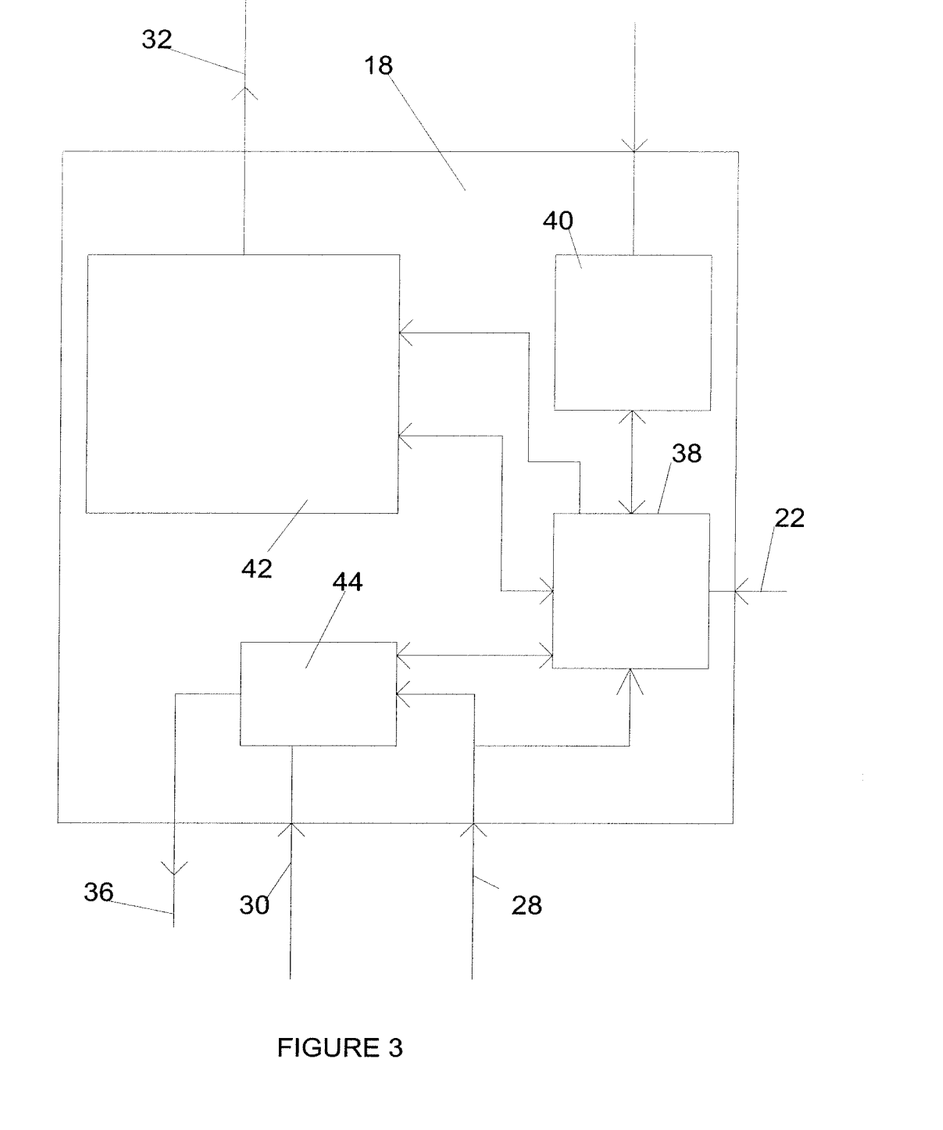
FIG. 3 is a schematic block diagram illustrative of possible exemplary contents of the control circuit of FIG. 2.

Attention is next drawn to FIG. 3, a schematic block diagram illustrative of possible exemplary contents of the control circuit 18.

A controller 38 is in overall command of the control circuit. A receiver and demodulator 40 receives the input from the first antenna 10 and delivers a data signal to the controller 38. A transmitter module 42 receives instructions, control signals and data signals from the controller 38 and provides input to the second antenna 32 to send the output radio signal 34. A power and data switch 44 is controlled by the controller 38 to determine how and where energy and data will be provided around and from the control circuit. The controller 38 also monitors the battery 26 positive power line 28 to assess the state of charge of the battery 26 and monitors the voltage sufficiency line 22 to determine whether or not the battery 26 can be charged.

Figure 4:
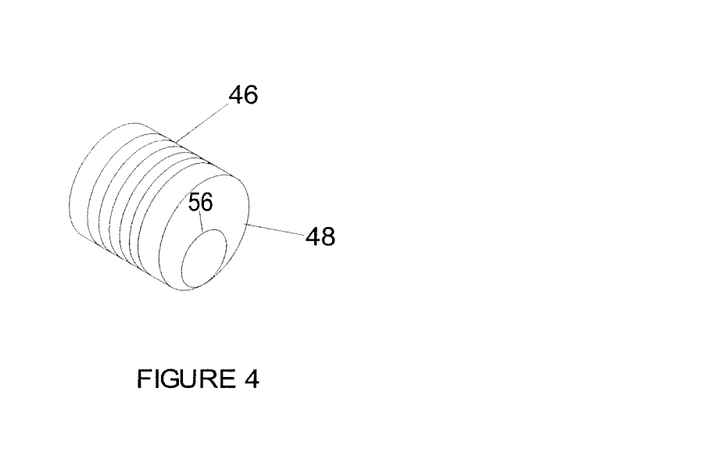
FIG. 4 is a perspective view of an exemplary magnetic antenna, suitable for use with radio signals or magnetic induction fields.
Figure 5:
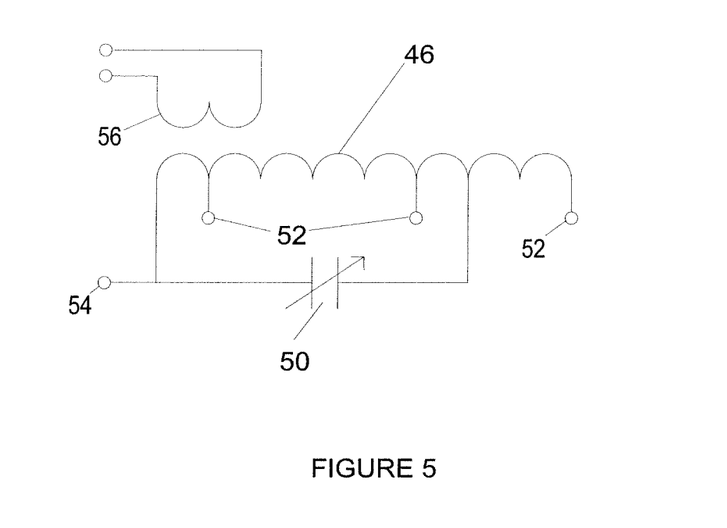
FIG. 5 is an exemplary circuit diagram illustrating tuning and impedance matching in the antenna of FIG. 4.

Attention is next, drawn to FIGS. 4 and 5, wherein FIG. 4 is a perspective view of an exemplary magnetic antenna, suitable for use with radio signals or magnetic induction fields and FIG. 5 is an exemplary circuit diagram illustrating tuning and impedance matching in the antenna of FIG. 4.

A main coil 46, preferably would on a former 48, is tuned to resonance by a variable capacitor 50. The resonance frequency is, typically, several megahertz to several tens of megahertz, but can be of any value. Taps 52 are arranged along the main coil 48 to provide a variety of voltages and impedances relative to a has terminal 54. Mutual Inductance coupled loops and coils 56 can be provided, with the same or a lesser diameter that the main coil 48. These are particularly of use in providing a drive feed impedance for the transmitter module 42. Not shown, but also of use, is the inclusion of low loss magnetic rods, such as ferrite, within the main coil 48, giving a greater effective area to the magnetic antenna because of relative permeability effects. Those skilled in the art will be aware of other means of feeding and impedance/voltage transformation that can be used with magnetic and magnetic induction antennas.

Figure 6:
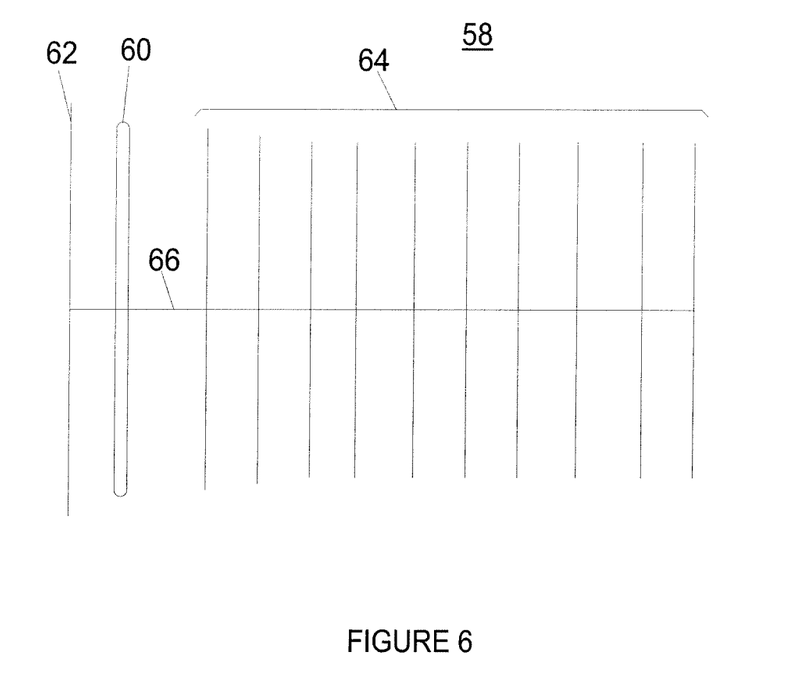
FIG. 6 shows an antenna suitable for high speed data transfer.
Figure 7:
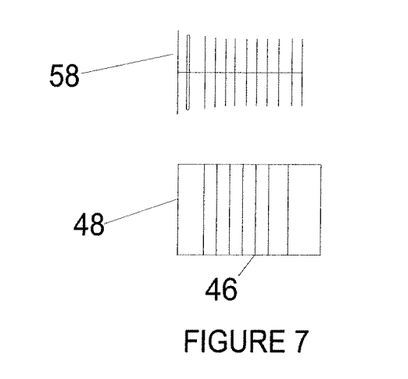
FIG. 7 shows a combined antenna.

Attention is next drawn to FIGS. 8 and 7, in which FIG. 6 shows an antenna suitable for high speed data transfer and FIG. 7 shows a combined magnetic and radio antenna.

FIG. 6 shows a single, exemplary high data transfer speed antenna. A yagi-uda array 58 is well known for reception and transmission of Win signals giving high data rates in the 24 or 5 GHz frequency range. Yagi-uda arrays can be used on almost any frequency, their dimensions being scaled in inverse proportion to the frequency used. They offer high gain and accordingly narrow beam width, useful for energy transfer. A driven or receiving element 60 is backed by one or more parallel slightly longer spaced reflector elements 62 and fronted by a plurality of slightly shorter parallel spaced director elements 64 to have maximum sensitivity and beam power in the direction along an axis 66 from the driven or receiving element 60. For greater sensitivity and directivity, vagi-gda arrays may be stacked side by side, above one another, or both.

Use is not restricted to Yagi-uda arrays. Antennas used can include, but are not restricted to: skeleton slat antennas and arrays; keyhole antennas and arrays; parabolic antennas and arrays, rhombic antennas and arrays, quad antennas and arrays; delta loop antennas and arrays; and a host of other possibilities.

Figure 8:
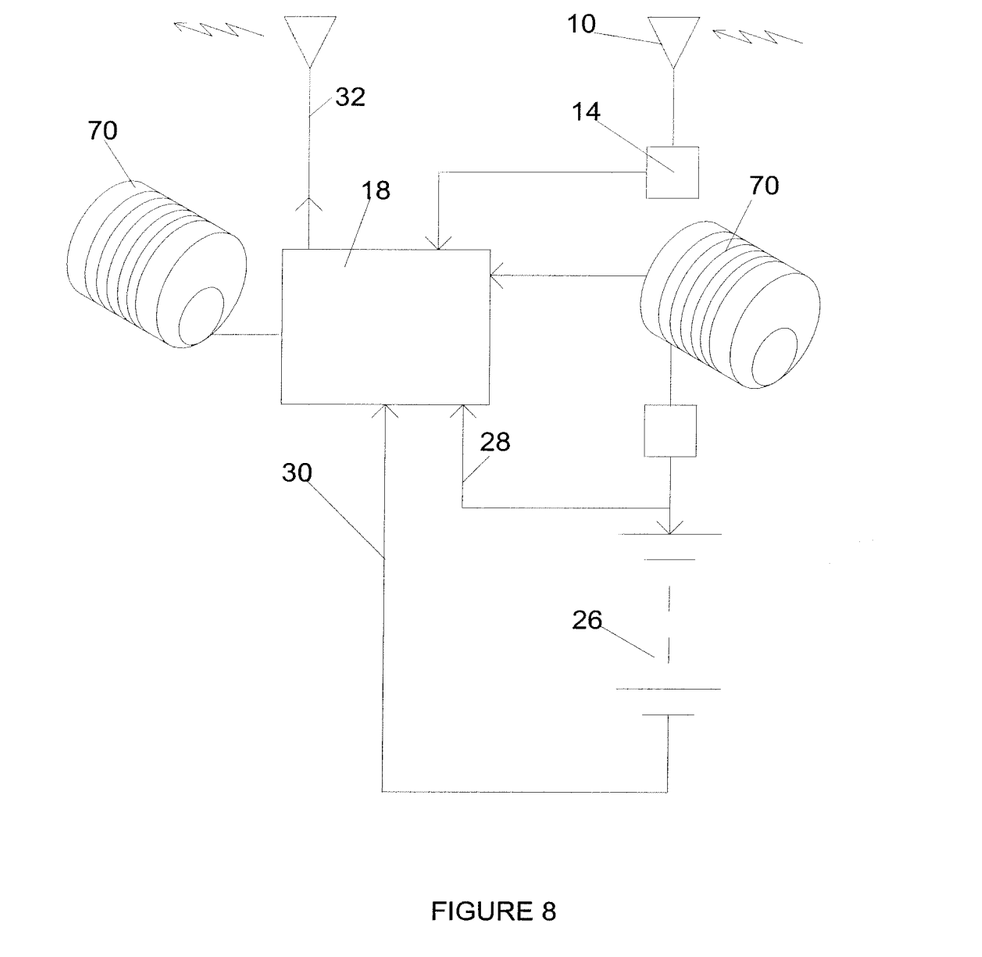
FIG. 8 is a block diagram showing how magnetic and radio antennas can be combined.

FIG. 7 shows a combined antenna, employing, in this example, both the antenna of FIG. 8 allowing high speed data transfer, an a magnetic antenna from FIGS. 4 and 5, where additional energy transfer may be required.

In practise, any type of antenna can be used, and any combination of two or more antennas employed.

FIG. 8 is a block diagram showing how magnetic and radio antennas can be combined.

FIG. 8 is similar to FIG. 2, and like numbers denote like items. Magnetic antennas 70, similar to those shown in FIGS. 4 and 5, are used for energy transfer because of the enhanced ability of inductive magnetic fields to transfer energy at safe field strengths compared with radio waves. On the other hand, magnetic antennas for inductive radio frequency (RF) magnetic fields have a lessened data carrying capacity. Accordingly, the first 10 and second 82 antennas are of, for example, the type shown in FIG. 7, having high speed data carrying capacity.

Figure 9:
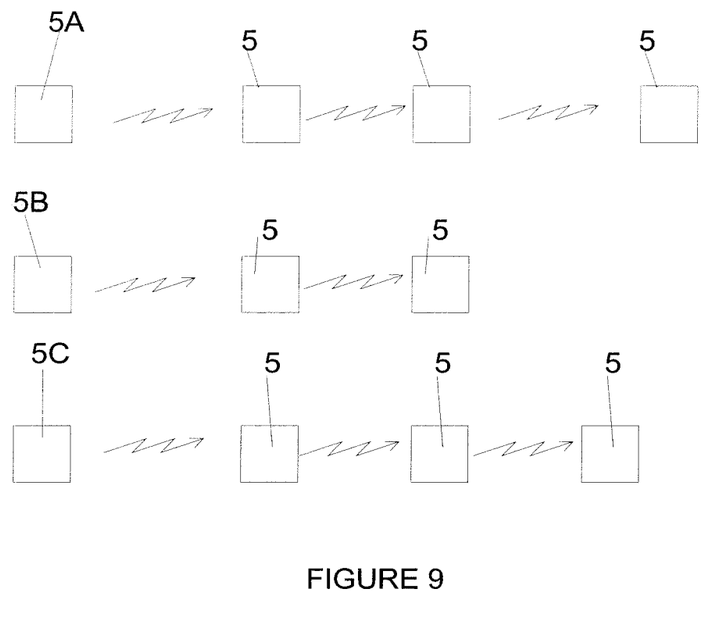
FIG. 9 is a block diagram illustrating how plural chains can be employed.

Attention is next drawn to FIG. 9, a block diagram illustrating how plural chains can be employed.

Within a building, home, site or institution, plural chains 5A 5B 5C 5 can be established and used. The chains 5A 5B 5C 5 can be functionally separated from one another by selection of field orientation, frequencies, field types (magnetic inductive or radio) and by physical separation. A head of chain data and energy transfer apparatus 5A 5B 5C is located at the head of each of the plural chains and other data and energy transfer apparatus 5 are disposed in each of the chains. The chains can be of different lengths. The chains can be operated at the same time, or at separate times.

The controller 38 in the control unit 18 can organize the operation of the other data and energy transfer apparatus 5.

In controlling a control circuit 18, the controller has many options. Potentially, the battery 26 has the ability to power initial control circuit 18 activity. However, if the battery is flat, operation is not possible and it is impossible for the control circuit 18 to function in the absence of power from the power supply 24. Assuming the control circuit 18 is powered, either by the battery or by the power supply, a first priority is to attend to the battery 26 charge so that post power supply 24 operation can occur. A first option is to check if the battery 26 is fully charged, and only to provide power and data through the control circuit 18 once the battery 26 is fully or at least partially charged.

Another priority is to check whether or not operation is for a final data and energy transfer apparatus 5. If this is the case, there is no need to operate the transmitter module 42. This, in one example, can be communicated to a particular data and energy transfer apparatus 5 by addressing transferred data to that data and energy transfer apparatus 5. This addressing can also indicate whether or not the data is to be transferred to the coupled data receiving powered apparatus 9.

Another priority is to determine if a particular data and energy transfer apparatus 5 is next in the chain. If a mutual bidirectional signalling capacity is available, this can be achieved by handshaking. If the transmitting frequency of the next in chain data and energy transfer apparatus 5 is tuned, handshaking data can be exchanged between data and energy transfer apparatus 5 for mutual authentication.

Finally, how is data provided? The head if chain data and energy transfer apparatus 5A 5B 5C can generate data to a particular of all data and energy transfer apparatus 5 in a chain if energy provision to apparatus and battery 26 charging is solely desired. The data and energy transfer apparatus 5 address data can be combined with usable data from an exterior source to direct the exterior source data to a particular data and energy transfer apparatus 5 or coupled data receiving powered apparatus 9.

Each chain 5A 5B 5C 5 can have a common head of chain unit, common to all of the chains 5A 5B 5C 5 which is operable to monitor messages passing up and down each chain 5A 5B 5C 5 to determine what units 5A 5B 5C 5 are functional, the condition of their function, the power consumption, and a host of other data. The common head of chain unit can comprise a screen to display the state of the units 5A 5B 5C 5. The screen can be a touch screen to control the units 5A 5B 5C 5. The system can comprise just one common head of chain unit, omitting the other head of chain units 5A 5B 5C. Equally, the other head of chain units can monitor unit 5A 5B 5C 5 functions and can comprise screens as the common head of chain unit. Down chain units 5 can also have screens and monitoring and control functions.

One application for the invention is to provide power within a motor vehicle, where data must be generated in a stand alone manner within a chain head unit 5A, 5B, 5C or within a common chain head unit.

The invention has been described with reference to radio waves and magnetic induction fields. It is to be appreciated that the invention also extends to employment of all types of fields, including but not limited to acoustic and ultrasonic fields, electric fields, and indeed any other type of field for which a receiving antenna or transducer and a transmitting antenna or transducer can be provided.

The invention has been described and explained in terms of embodiments and examples. Those skilled in the art will be aware of differences and variations which can be employed without departing from the invention as defined by the following Claims.

The invention claimed is:

1. An apparatus in a chain of apparatuses for receiving an input signal from a previous apparatus in the chain, the apparatus comprising:
    a first antenna, operable to receive the input signal from the previous apparatus, the input signal being modulated to include a first data signal;
    a receiver and decoder to receive the input signal from the first antenna and demodulate the first data signal from the input signal;
    a convertor to convert the input signal into electrical energy based on impedance matching of the first antenna to a notional load for powering the apparatus;
    a resting power controller to set the apparatus into a low power mode when the input signal is below a predetermined strength; and
    a controller to:
        receive the first data signal from the receiver and decoder;
        determine whether a next apparatus is present in the chain;
        determine whether a data receiving powered apparatus is connected to the apparatus;
        when the data receiving powered apparatus is determined to be connected to the apparatus, send, through a switch coupled to the controller, at least one of power and data from the first data signal to the data receiving powered apparatus based on needs of the data receiving powered apparatus; and
        when the next apparatus is determined to be present in the chain,
            provide a second data signal to a signal generator to produce an output signal modulated with the second data signal, wherein the second data signal is formed from at least part of the first data signal; and
            control the signal generator to transmit the output signal to a second antenna, wherein the second antenna transmits the output signal to the next apparatus in the chain.

2. The apparatus according to claim 1, wherein the first antenna includes a first antenna element adapted for high speed data transfer, and a second antenna element adapted for power transfer.

3. The apparatus according to claim 2, wherein the first antenna element is chosen from a group consisting of: Yagi-uda arrays; skeleton slat antennas and arrays; keyhole antennas and arrays; parabolic antennas and arrays; rhombic antennas and arrays; quad antennas and arrays; delta loop antennas and arrays; and
    the second antenna element is a magnetic antenna.

4. The apparatus according to claim 1, wherein the second antenna includes a first antenna element adapted for high speed data transfer, and a second antenna element adapted for power transfer.

5. The apparatus according to claim 4, wherein the first antenna element is chosen from a group consisting of: Yagi-uda arrays; skeleton slat antennas and arrays; keyhole antennas and arrays; parabolic antennas and arrays; rhombic antennas and arrays; quad antennas and arrays; delta loop antennas and arrays; and
    the second antenna element is a magnetic antenna.

6. The apparatus according to claim 1, wherein at least one of the input signal and the output signal comprises one of acoustic waves, ultrasonic waves, magnetic waves, and radio waves.

7. The apparatus according to claim 1, wherein the first data signal includes address data to address the apparatus and wherein the address data indicates whether data is to be transferred to the signal generator for inclusion in the output signal.

8. The apparatus according to claim 7, wherein the first data signal is combined with data from an exterior source and transferred to the signal generator for inclusion in the output signal.

9. The apparatus according to claim 1, wherein the output signal includes handshake data and authentication data, and the apparatus receives additional handshake and authentication data from a further data received from the next apparatus in chain.

10. The apparatus according to claim 1, wherein the controller is to determine whether the next apparatus is present in the chain based on a last-in-chain indication in the input signal.

11. The apparatus according to claim 1, wherein the output signal includes data on a state of the apparatus.

12. The apparatus according to claim 1, wherein the apparatus sends the at least one of power and data from the first data signal to the data receiving powered apparatus through a power and/or data coupling.

13. The apparatus according to claim 1, wherein the chain of apparatuses comprises a head apparatus at head of the chain to at least one of:
    monitor messages passing in the chain;
    determine what apparatuses in the chain are functional;
    determine condition of function of the apparatuses;
    determine power consumption of the apparatuses; and
    control the apparatuses in the chain.

14. The apparatus according to claim 13, wherein the head apparatus receives energy from a power source and data signal from a data source.

15. The apparatus according to claim 1, wherein when a next apparatus is determined to be absent in the chain, the controller stops operation of the signal generator to conserve power.

16. The apparatus according to claim 1, wherein the apparatus comprises an antenna impedance matcher to match impedance of the first antenna to impedance of the notional load.

17. The apparatus according to claim 1, wherein the apparatus comprises impedance transformation means to transform impedance of the notional load to provide an un-rectified voltage sufficient for rectification.

18. The apparatus according to claim 17, wherein the apparatus comprises rectification and smoothing means operable to provide a DC voltage.

* * * * *